United States Patent

[11] 3,623,952

[72] Inventors Koji Kubota;
 Teruo Shiro, both of Kanagawa-ken, Japan
[21] Appl. No. 777,459
[22] Filed Nov. 20, 1968
[45] Patented Nov. 30, 1971
[73] Assignee Ajinomoto Co., Inc.
 Tokyo, Japan
[32] Priorities Mar. 8, 1968
[33] Japan
[31] 43/76617;
 Nov. 29, 1967, Japan, No. 42/15102

[54] METHOD OF PRODUCING L-SERINE BY FERMENTATION
 8 Claims, No Drawings
[52] U.S. Cl. .................................................... 195/29
[51] Int. Cl. ................................................ C12d 13/06
[50] Field of Search ..................................... 195/28, 29

[56] References Cited
UNITED STATES PATENTS
3,222,258 12/1965 Iizuka ........................... 195/29

OTHER REFERENCES

Breed et al. " Bergey' s Manual of Determiniative Bacteriology" 7th Edition, 1957, pp. 502–503, 579, 611

Skimer et al. " Hennici' s Molds, Yeasts and Actinomycetes" 2nd Edition 1930, pp. 281, 289

Primary Examiner—A. Louis Monacell
Assistant Examiner—Max D. Hensley
Attorney—Kelman & Berman ABSTRACT: When certain strains of Brevibacterium helvolum, Arthrobacter citreus, Corynebacterium sp., and *Candida pulcherrima* are cultured aerobically at pH 5–9 on an otherwise conventional aqueous medium containing 0.5 percent to 4 percent by weight glycine, L-serine accumulates in the culture broth and is readily recovered in high yields.

METHOD OF PRODUCING L-SERINE BY FERMENTATION

This invention relates to a method of producing L-serine, and in particular to a method of producing L-serine from glycine by microbial fermentation at low cost.

L-serine is classified as an amino acid nonessential to rats, but it has found applications as a food supplement, as a raw material for cosmetics and in medicine. L-serine has been isolated heretofore from protein hydrolyzates, and it has been prepared by optical resolution of synthetic serine. It has also been known that L-serine can be prepared from glyceric acid by employing an enzyme obtained from micro-organisms (Jap. Pat. publication No. 17728/67). The serine-bearing protein hydrolyzates contain other amino acids from which serine cannot be separated at high yield. L-serine, moreover, racemizes readily and also decomposes at the normal conditions for hydrolysis, whereby the yield of the hydrolysis method is further reduced.

An object of the present invention is the provision of L-serine at low cost in a simpler operation than was available until now.

We have found that some micro-organisms belonging to genera Brevibacterium, Arthorobacter, Corynebacterium, and Candida have an ability to produce useful amounts of L-serine from glycine. We can not find prior reports that a significant amount of L-serine was produced and accumulated in a medium containing glycine by cultivation of micro-organisms.

We could obtain many strains, which had an ability to produce L-serine from glycine from micro-organisms belonging to the above-mentioned four genera, especially from micro-organisms belonging to Brevibacterium helvolum, Arthrobacter citreus, Corynebacterium sp. and Candida pulcherrima.

Brevibacterium helvolum ATCC 21342, Arthrobacter citreus ATCC 11624, Corynebacterium sp. ATCC 21341, and Candida pulcherrima IFO 0561 are representative micro-organisms which may be employed in the present method. The above-mentioned three strains which have ATCC numbers were deposited with the American Type Culture Collection, and are freely available to any person. The strain which has an IFO number is a stock culture at the Institute for Fermentation, Osaka, Japan and is freely available from the Institute.

The culture media employed for producing L-serine in our method may be entirely conventional. They must contain an assimilable carbon source, an assimilable nitrogen source, growth-promoting substances, and inorganic ions. Carbon sources suitable for use in the present invention are glucose, sucrose, maltose, fructose, starch hydrolyzate and molasses. Organic acids such as acetic acid and citric acid, alcohols and hydrocarbons may also be employed as carbon sources. A nitrogen source may be provided by ammonium salts of inorganic acids such as ammonium sulfate and ammonium chloride, or by ammonia in an aqueous solution or in the gaseous state. Organic compounds such as amino acids, urea or protein hydrolyzate may also be used. The inorganic stance may be a phosphate, a salt of calcium, a salt of magnesium, iron, manganese and so on as is conventional. The growth-promoting agents and other nutrients ions may be phosphate, calcium, magne- include amino acids, various vitamins, soya bean protein hydrolyzate, yeast extract, corn steep liquor, peptone, casein hydrolyzate and so on.

Glycine concentration in the culture medium is desirably between 0.5 and 4 percent by weight. Glycine may be added to the medium before the inoculation with the micro-organisms or at the beginning of the fermentation. It may also be added partly to the medium at the beginning and partly during the fermentation.

The fermentation is preferably carried out under aerobic conditions. For the best results, the pH value of the culture medium should be controlled between 5.0 and 9.0. When the pH of the medium tends to rise above 9.0, it may be adjusted by means of hydrogen chloride or sulfuric acid. If the pH of the medium tends to fall below 5.0, it is adjusted by means of calcium carbonate, ammonia, caustic soda or caustic potash.

The cultivating temperature is from 24° to 37° C. Usually, the fermentation is carried out for 2–7 days.

The recovery of L-serine from the fermented broth is very easy because the amount of other amino acids in the broth is quite small, and it may follow known methods.

The product of the present invention was identified as L-serine by its Rf value in paperchromatography and its biological activity, and L-serine in the broth is determined by microbioassay employing Leuconostoc mesenteroides.

The following examples are illustrative of the present invention.

EXAMPLE 1

An aqueous culture medium was prepared to contain 5 percent hydrolyzate of sweet potato starch (in glucose equivalent), 0.1 percent polypepton, 0.3 percent yeast extract, and 0.5 percent glycine. Twenty milliliter batches of the solution were placed in 500 ml. shaking flasks, and were sterilized by steam at 110° C. for 5 minutes.

The aqueous media were inoculated with seed cultures of Brevibacterium helvolum ATCC 21342 incubated on bouillon agar slants at 30° C. for 24 hours. The micro-organisms were cultured in the aqueous media, whose pH value of the beginning was 6.0, at 30° C. for 72 hours with shaking. After 72 hours of fermentation, 1 g./l. of L-serine was found in the medium.

The microbial cells were removed from 1 liter of the combined culture broth by filtration, and the cell-free solution was passed over a cationic ion exchange resin of the H-type (Dowex 50). L-serine absorbed on the ion exchange resin was eluted by 1.5 N aqueous ammonia, and the effluent was concentrated under reduced pressure. 0.72 g. crude crystalline L-serine was obtained from the concentrated solution by addition of cool alcohol.

EXAMPLE 2

An aqueous culture medium was prepared to contain 5 percent glucose, 0.2% $NH_4)_2SO_4$, 0.3% $NH_4NO_3$, 0.1% $KH_2PO_4$, 0.05% $MgSO_4·7H_2O$, 0.5 ml./dl. corn steep liquor and 2 percent glycine, sterilized by steam at 110° C. for 5 minutes, and adjusted to pH 6.5–7.5 by means of aqueous ammonia.

The aqueous media were inoculated with seed cultures prepared by culturing Corynebacterium sp. ATCC 21341 on a medium containing 1 percent glycine, 1 percent glucose, 1 percent bouillon, 1 percent polypepton and 0.5 percent NaCl at 30° C. for 24 hours with aeration and agitation.

The fermentation was carried out at 30° C. for 60 hours under aeration and agitation. 5.6 mg./ml. of L-serine were found in the broth, and the amount of residual glycine was 4.2 mg./ml.

The microbial cells were removed from 1 liter of the broth by filtration, and the cell-free solution was adjusted to pH 1.0–2.0 and was passed over an ion exchange resin (Dowex 50-X4). This resin was washed with 1 liter of water and 0.025N hydrochloric acid, and the L-serine fraction was eluted by 0.2N hydrochloric acid. The effluent was concentrated under reduced pressure and crude crystalline L-serine was precipitated from the concentrated solution by addition of cool alcohol. 3.0 g. of pure L-serine were obtained by recrystallization.

EXAMPLE 3

An aqueous culture medium was prepared to contain 5 percent glucose, 0.1 percent $KH_2PO_4$, 0.04 percent $MgSO_4·7H_2O$, 0.5 percent $(NH_4)_2SO_4$, 2 percent soya bean protein hydrolyzate, 50μg./l. biotin, 100μg./l. vitamin $B_1$ hydrochloride, 2 p.p.m. Fe, 2 p.p.m. Mn, 2 percent glycine and 2.5 percent $CaCO_3$ (sterilized separately). 20 ml. batches of the solution were placed in 500 ml. shaking flasks, and were sterilized by steam at 110° C. for 5 minutes.

The aqueous media were inoculated with Arthrobacter citreus ATCC 11624 cultured on bouillon agar slants at 30° C.

for 24 hours. The fermentation was carried out at 31.5° C. for 5 days with shaking. After 5 days of cultivation, 3.42 g./l. of L-serine were found in the broth.

11.5 g. crude crystalline L-serine were obtained in the same way as in example 1.

EXAMPLE 4

An aqueous culture medium was prepared to contain 5 percent hydrolyzate of sweet potato starch (in glucose equivalent), 0.3 percent $(NH_4)_2SO_4$, 0.1 percent $KH_2PO_4$, 0.05 percent $MgSO_4 \cdot 7H_2O$, 0.3 percent casa amino acids and 0.1 percent yeast extract.

Thirty Liters of the medium were inoculated with 1.5 liters of a seed culture prepared as described in example 2.

The cultivation was carried out at 30° C. under aeration and agitation, and glycine sterilized separately was added to the broth in an amount of 2 percent by weight when the propagation of the micro-organism reached a stationary maximum. The fermentation was continued for 40 hours under aeration and agitation. 8.1 mg./ml. of L-serine were found in the fermented broth.

EXAMPLE 5

An aqueous culture medium was prepared to contain 7 percent hydrolyzate of sweet potato starch (in glucose equivalent), 0.1 percent $KH_2PO_4$, 0.04 percent $MgSO_4 \cdot 7H_2O$, 1 percent $(NH_4)_2SO_4$, 0.2 percent malt extract, 2 percent glycine, 0.5 percent casa amino acid, 100 $\mu$g./l. biotin, 200 $\mu$g./l. vitamin $B_1$ hydrochloride, 2 p.p.m. Fe, 2 p.p.m. Mn, and 2 percent $CaCO_3$ (sterilized separately), and was adjusted to pH 6.8.

The medium was sterilized in the usual manner and inoculated with *Candida pulcherrima* IFO 0561. 4.4 g./l. of L-serine were found to be accumulated in the broth after 4 days of cultivation at 30° C.

We claim:

1. A method of preparing L-serine by fermentation which comprises culturing a micro-organism selected from the group consisting of *Brevibacterium*, *Arthrobacter*, *Corynebacterium*, and *Candida* at pH 5–9 in a culture medium containing an assimilable carbon source, an assimilable nitrogen source, inorganic salts, and glycine in an amount of 0.5 to 4 percent of the weight of said culture medium until L-serine accumulates in said medium, said micro-organism being capable of accumulating said L-serine from said glycine; and recovering the accumulated L-serine from the medium.

2. A method as set forth in claim 1, wherein said micro-organism is a strain of *Brevibacterium helvolum*, *Arthrobacter citreus*, or *Candida pulcherrima*.

3. A method as forth in claim 1, wherein said micro-organism is *Brevibacterium helvolum* ATCC 21342, *Arthrobacter citreus* ATCC 11624, *Corynebacterium sp.* ATCC 21341, or *Candida pulcherrima* IFO 0561.

4. A method as forth in claim 1, wherein said micro-organism is *Brevibacterium helvbum* ATCC 21342.

5. A method as set forth in claim 1, wherein said micro-organism is *Arthrobacter citreus* ATCC 11624.

6. A method as set forth in claim 1, wherein said micro-organism is *Corynebacterium sp.* ATCC 21341.

7. A method as set forth in claim 1, wherein said micro-organism is *Candida pulcherrima* IFO 0561.

8. A method as forth in claim 1, wherein at least a portion of said glycine is added during said culturing.

* * * * *